(12) United States Patent
Boden et al.

(10) Patent No.: US 8,495,518 B2
(45) Date of Patent: Jul. 23, 2013

(54) CONTEXTUAL ABNORMALITY CAPTCHAS

(75) Inventors: Edward B. Boden, Poughkeepsie, NY (US); Michael L. Greenblatt, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 309 days.

(21) Appl. No.: 12/614,913

(22) Filed: Nov. 9, 2009

(65) Prior Publication Data

US 2011/0113378 A1 May 12, 2011

(51) Int. Cl.
*G06F 3/048* (2006.01)
(52) U.S. Cl.
USPC ............ 715/837; 707/915; 463/31; 715/781; 345/582
(58) Field of Classification Search
USPC ........................................ 715/837
See application file for complete search history.

(56) References Cited

U.S. PATENT DOCUMENTS

| | | | |
|---|---|---|---|
| 6,996,287 B1 * | 2/2006 | Weiss | 382/260 |
| 7,383,570 B2 | 6/2008 | Pinkas et al. | |
| 2007/0201745 A1 | 8/2007 | Wang et al. | |
| 2008/0066014 A1 | 3/2008 | Misra | |
| 2009/0113294 A1 | 4/2009 | Sanghavi et al. | |
| 2009/0138723 A1 | 5/2009 | Nyang et al. | |
| 2009/0231356 A1 * | 9/2009 | Barnes et al. | 345/594 |
| 2010/0210358 A1 * | 8/2010 | Csurka et al. | 463/31 |
| 2010/0228804 A1 * | 9/2010 | Dasgupta et al. | 707/915 |

OTHER PUBLICATIONS

Kumar Chellapilla et al., "Designing Human Friendly Human Interaction Proofs (HIPS)," CHI 2005, Papers: Email and Security, Apr. 2-7, 2005, Portland, Oregon, USA.
Rich Gossweiler et al., "What's Up CAPTCHA? A CAPTCHA Based on Image Orientation," International World Wide Web Conference, Apr. 20-24, 2009, Madrid Spain.
Jeff Yan et al., "Breaking Visual CAPTCHAs with Naive Pattern Recognition Algorithms," School of Computing Science, 2007, Newcastle University, UK.

* cited by examiner

*Primary Examiner* — Alvin Tan
*Assistant Examiner* — Ayesha Huertas Torres
(74) *Attorney, Agent, or Firm* — Cantor Colburn LLP; William A. Kinnaman, Jr.

(57) ABSTRACT

A method, computing device, and computer program product are provided for automatically generating contextual image tests implemented on a computer. An image is received by a computer. Sections of the image are altered to appear out of context or wrong to human users. The user must then identify the errors to pass the CAPTCHA.

25 Claims, 8 Drawing Sheets

CONTEXTUAL ABNORMALITY CAPTCHAS

BACKGROUND

Exemplary embodiments relate to distinguishing computers and humans, and more specifically, to tests for distinguishing computers and humans.

CAPTCHA stands for "Completely Automated Public Turing Test to Tell Computers and Humans Apart", and CAPTCHAs are designed to tell the difference between humans and a computer program based on their respective abilities to solve a problem. CAPTCHAs are commonly used on Web pages where people register for an account, like email sites such as Yahoo®, Microsoft®, and Google®. Their purpose is to prevent (or slow) the use of programmed registrations which are then commonly used for spam and other uses depending on the Web site. The use of CAPTCHAs is expected to grow, and future use can be expected in various virtual environments such as, e.g. Second Life®. The most common type of CAPTCHA is implemented by asking the user to look at an image and type the alphabetic or numeric characters in it. Improved character recognition software can now circumvent this basic CAPTCHA, and there is now a need for a new generation of CAPTCHA tests.

There is now a movement from simple character recognition to image recognition CAPTCHAs. It is presumed that hackers will work to exploit this and improve their image recognition software (just like they improved character recognition). There is a race between CAPTCHA developers and spammers.

BRIEF SUMMARY

According to one exemplary embodiment, a method for automatically generating contextual image tests implemented on a computer is provided. An image is received by a computer. The image is divided into objects by the computer such that the objects can be selected. An original object from the objects is selected by the computer for replacement. The original object is replaced by the computer with a similarly shaped replacement object. The original object is swapped for the replacement object in the image, and the replacement object is an abnormality in the image.

According to one exemplary embodiment, a method for automatically generating contextual image tests implemented on a computer is provided. The computer receives an image and selects one or more image parts of the image for change based on image analysis. The computer determines modifications for the selected one or more image parts and a modification source for each selected image part. The computer applies the modifications to the one or more image parts to create a modified image.

Additional features are realized through the techniques of the present disclosure. Other systems, methods, apparatus, and/or computer program products according to other embodiments are described in detail herein and are considered a part of the claimed invention. For a better understanding of exemplary embodiments and features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features of the present disclosure are apparent from the following detailed description taken in conjunction with the accompanying drawings in which:

DETAILED DESCRIPTION

Exemplary embodiments provide a new class of CAPTCHAs that will allow the owning Web sites to keep ahead of the automated attacks.

Exemplary embodiments provide a CAPTCHA test requiring the users to identify errors in the context of an altered image. Various kinds of errors may be utilized, based on a person having an overall understanding of the picture and its various parts. In accordance with exemplary embodiments, it is the reliance on semantics that makes this class of CAPTCHAs more difficult to automate a solution. Exemplary embodiments design a much more complicated problem for an automated program to solve, but the CAPTCHA is still easy for people to solve. In exemplary embodiments, a spam program cannot simply program the expected dimensions and characteristics of a human face or certain animal images, because the program does not know how an application of exemplary embodiments is going to alter the base image. The image may also employ various image distortions currently in use for the purpose of slowing attacks.

CAPTCHAs of exemplary embodiments test users' ability to detect anomalies in the context of an image as a component to stop programmatic CAPTCHA workarounds. Users will be presented with an image with some error. A person can quickly identify the error because people can understand the context of the picture but a computer cannot. Accordingly, this goes beyond simple image recognition to awareness of the context of the image in accordance with exemplary embodiments.

Furthermore, even young children can easily tell what belongs in certain environments and what does not, but it is very difficult to develop a program that is aware of what is "normally acceptable" in all circumstances. Many examples are illustrated herein for ease understanding but not for limitation.

Figure 1:
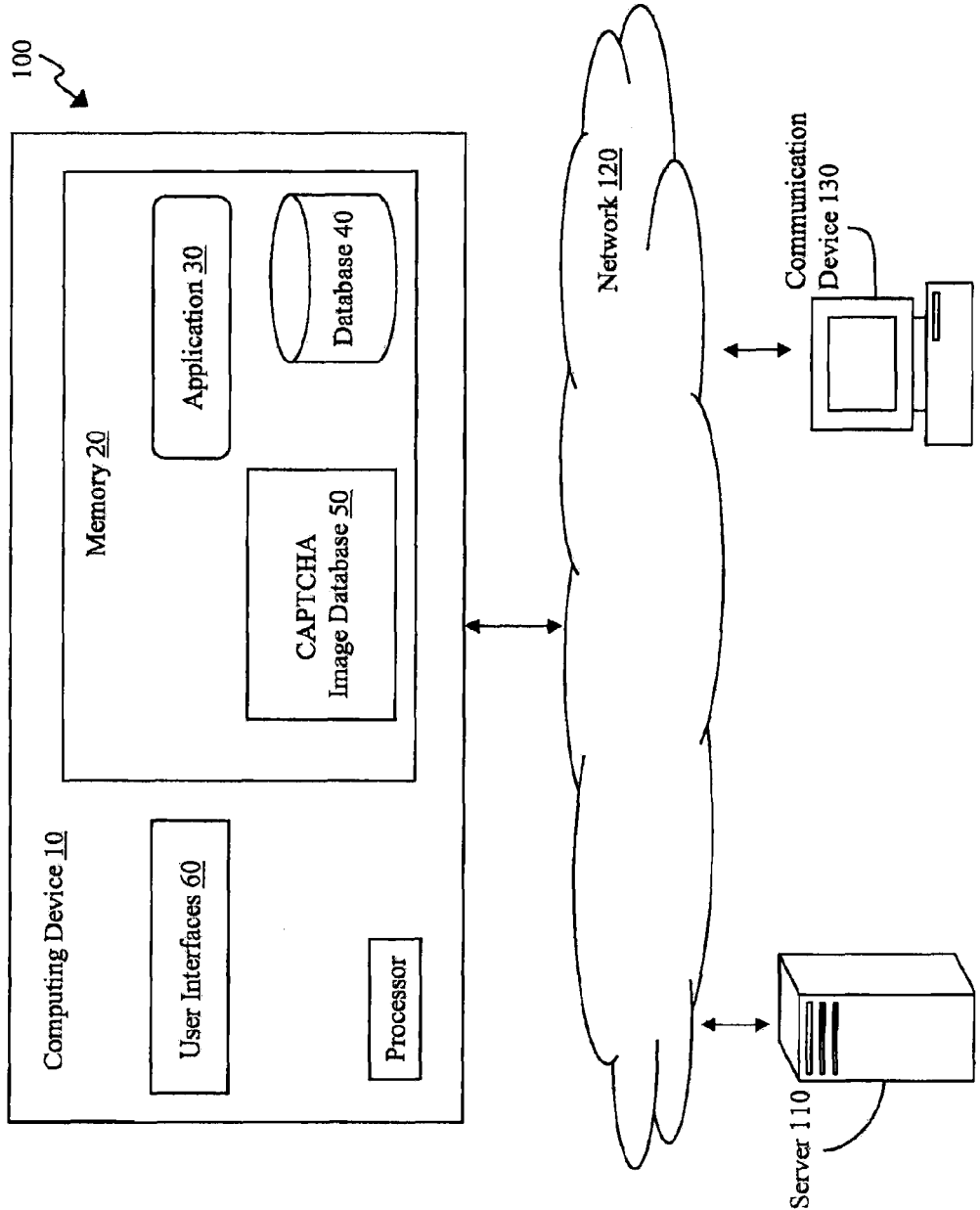
FIG. 1 illustrates a block diagram in accordance with exemplary embodiments.

Now turning to FIG. 1, FIG. 1 illustrates a block diagram 100 in accordance with exemplary embodiments.

A computing device 10 is configured to create and implement the CAPTCHA system disclosed herein. The computing device 10 may include memory 20 and/or be operatively connected to the memory 20. The memory 20 may be a computer readable storage medium as understood by one skilled in the art and further discussed herein.

One or more applications 30 may be coupled to the memory 20. The application 30 is operative to implement the CAPTCHA system according to exemplary embodiments. Also, an operator of the computing device 10 may utilize a user interface 60 (such as a keyboard, mouse, touch screen, tracking ball, etc.) to interface with the application 30, along with a graphical user interface as understood by one skilled in the art.

In exemplary embodiments, the application 30 is operative to provide an image based CAPTCHA system that asks the user to identify one or more context errors in a CAPTCHA image. For example, the application 30 is operative to automatically obtain various images from, e.g., various computer systems via the network 120 and load the images in a database 40. Also, the operator may load images in the database 40. The images in the database 40 are normal and have not been modified by the application 30. The normal images in the database 40 may also be referred to as stock images.

The application 30 is operative to retrieve the normal images from the database 40 and modify the images to be CAPTCHA images with context errors identifiable by humans. The application 30 stores the CAPTCHA images in a CAPTCHA image database 50. For example, the application 30 is operative to automatically create the context errors by distorting or altering an image, adding out of context items to an image, and/or removing context relevant items from an image.

In exemplary embodiments, the application 30 is operative to provide various CAPTCHAs to a server 110, e.g., as a fee based service, along with the application 30 and/or any necessary software to utilize the CAPTCHAs as test for distinguishing between humans and computers.

The application 30 is operative to provide a user of the communication device 130 with a CAPTCHA image having one or more abnormalities that are recognizable to a human based on the context of the image. The changes made to a stock image by the application 30 may cause the stock image to differ from the CAPTCHA image in nature, semantics objects, interrelationships, characteristics, context, and/or combinations of these. A change by the application 30 can be adding an out of context object and/or removing some crucial element. The change by the application 30 may include alterations to the stock image such as blurring and/or distorting a region of the image and/or altering the color of a region of the stock image. The changes can be manually entered by an operator and/or generated by the application 30.

When a CAPTCHA image is presented to the user by the application 30, the user of the communication device 130 may be asked to click the regions of the CAPTCHA image with abnormalities. If the user clicks an incorrect area on the CAPTCHA image, the application 30 is operative to choose to allow the user to try another CAPTCHA image and/or reject the user as non-human (depending on the preferences of the service provider such as the server 110). After the user believes he or she has clicked all the errors on the CAPTCHA image, the application 30 is operative to allow the user to click a done button.

Exemplary embodiments provide successful CAPTCHA technology as the application 30 is operative to (a) automatically generate CAPTCHA instances within a very large space of CAPTCHA possibilities, and (b) automatically verify the 'answer' received from a Web browser or other source, e.g., input by the user (e.g., by clicking on an abnormal area of the CAPTCHA) of the communication device 130.

Figure 2:
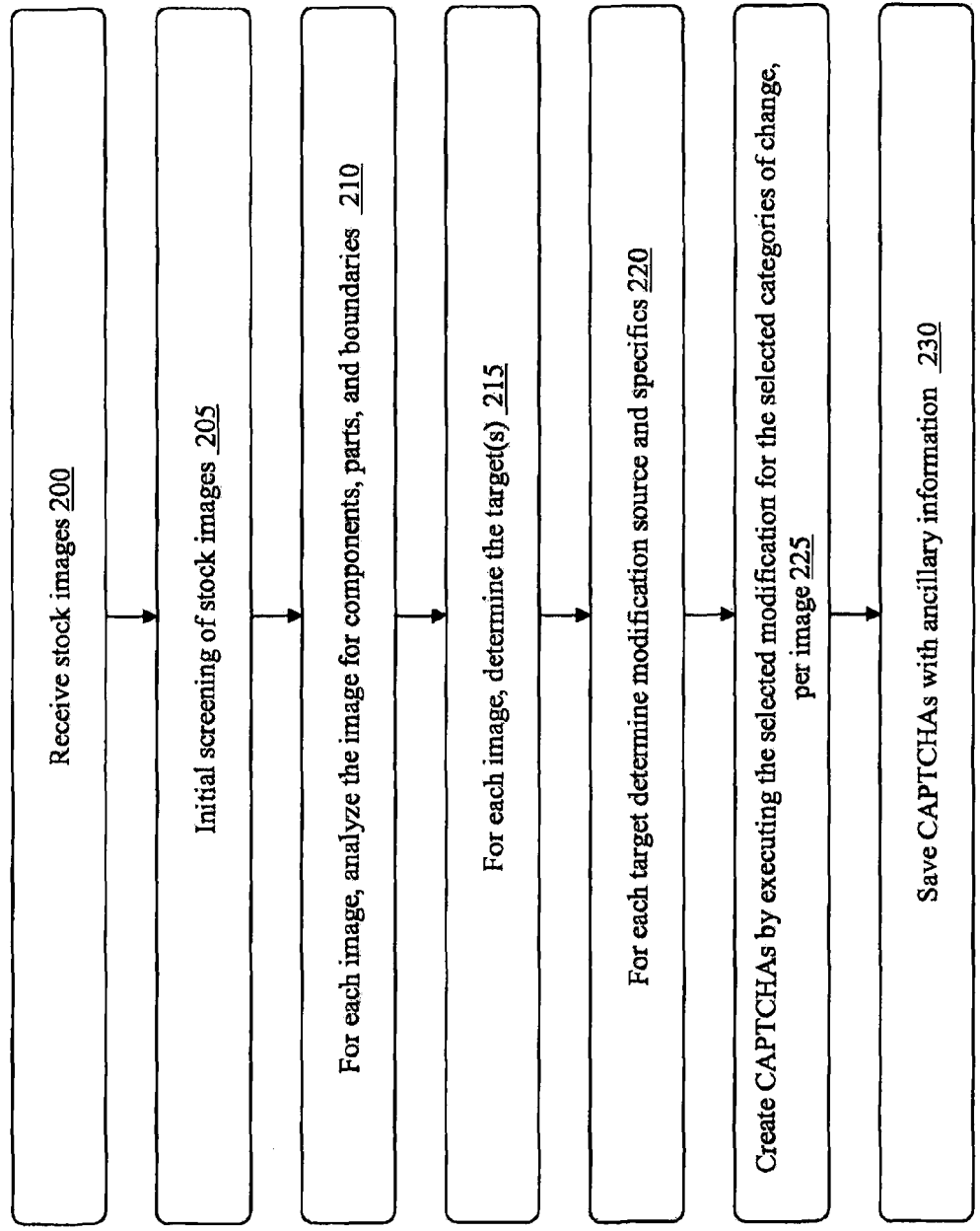
FIG. 2 illustrates a process for creating CAPTCHA images in accordance with exemplary embodiments.

FIG. 2 illustrates a process for creating CAPTCHA images in accordance with exemplary embodiments. The application 30 is configured to automatically create CAPTCHA images as discussed herein without operator assistance. It is also understood that an operator may utilize the application 30 to create CAPTCHA images and/or the operator may perform certain operations while the application 30 performs other operations.

The application 30 is operative to receive (use) any source of stock images as input into the CAPTCHA creation program implemented by the application 30 at operation 200. For example, operators could even take their own pictures and provide them to the application 30. Also, operators and/or the application 30 can download images that are available for this purpose over the network 120, such as the Internet. For example, Web sites such as Flickr® provide free, tagged, creative common licensed images that could be used by the application 30. Also, Google™ images provides numerous images.

From any source utilized as stock images, the application 30 is operative to initially screen images to eliminate unacceptable and/or unusable images at operation 205. For example, the application 30 may analyze metadata (such as tags, captions, descriptions, etc.) of images, and any metadata that matches hits of, e.g., offensive subject matter stored in the database 40 would be eliminated as unacceptable and/or unusable images. Generally, the application 30 is configured to select images of ordinary human experience of the physical world, not abstractions, designs, schematics, and/or technical images. For example, the application 30 is configured not to select images of outer space, photomicrographs, and/or difficult to identify machinery. Further, no images are selected that will cause offense. Also, when creating CAPTCHA images according to exemplary embodiments, some images are more useful than others. For example, if the application 30 analyzes the image and determines that the image has only a few objects, the application 30 is operative to recognize that such an image is (or may) not a good choice for creating a CAPTCHA according to exemplary embodiments. As such, the application 30 is operative to screen-out the image. For example, to determine if an image is a good choice or not for creating a CAPTCHA, the application 30 is operative to analyze the image and divide the image into objects. If the image has too few objects, the application 30 can determine that the image may be a bad choice as a base image for creating a CAPTCHA. Also, the application 30 is configured to determine how many colors and/or shades of color are in an image. If an image has only one or two colors as determined by the application 30, the application 30 may be configured to determine that such an image may not a good base image. The application 30 (and/or the operator) can automatically eliminate the (bad) type of images as discussed above. Also, if an image has only one or two colors as determined by the application 30, the application 30 may be configured to determine that such an image may not a good base image. The application 30 (and/or the operator) can automatically eliminate the (bad) type of images as discussed above.

For each image that passes initial screening by the application 30, the application 30 is operative to analyze the image for visually obvious components, parts, and boundaries at operation 210.

Figure 8:
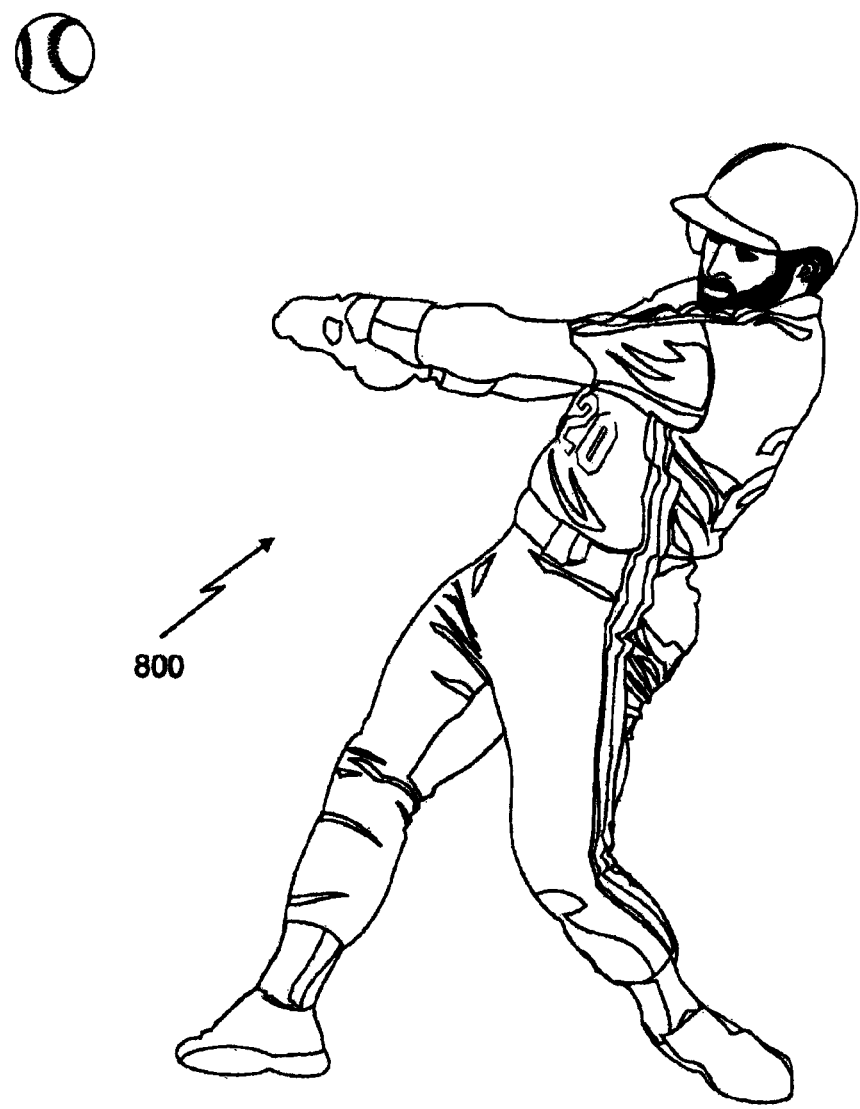

Once determined, one or more targets to change are determined by the application 30 at operation 215. There may be three types of targets for the application 30 which include selection based on image part, selection based on a two-dimensional geometric shape chosen independently of the image, and/or selection of a point for insertion or modification. A selection based on image part means the target is a region of the CAPTCHA image based on the object that was in the image already. An example is FIG. 8, FIG. 8 illustrates a CAPTCHA image where the target image element (e.g., bat) is selected, the modification is remove, and the source pixels are generated by application 30 based on background image material surrounding the selected element (the bat) to have the effect of making the bat disappear. The application 30 is also operative to simply select a random geometric shape as the target and use it as a change region. For example, the application 30 may select a square section of a base image and apply any of the many transformations described in this document. Utilizing an image of a crowd at a baseball game, the application 30 may select any random square section of the image as the target and insert from some other image source, e.g., a close-up of a dog's face, and the user will still be able to identify this as an anomaly. This is a simple technique, which does not require sophisticated object selection by the application 30. Yet another possibility is that the application 30 may select a point in the image as the target, and the boundaries of the modification are defined by the source item being inserted. This point could be selected based on analysis and/or randomly chosen by the application 30. For example, FIG. 9 could have been generated by randomly selecting a target location, and then inserting the basketball source object by the application 30.

An image may have multiple elements (image parts) selected for change, in multiple categories in operation 215. A further output of this operation 215 is the definition of the 'active' (clickable) points for the image, which are associated with the image. Each image part to change (target) has its own set of active points; the image has other active points that may be chosen (clicked) by users as incorrect answers.

For each selected active part of an image (target), the application 30 is operative to determine the type of modification and the source of the replacement pixels at operation 220. Examples of source pixels may be the current image, external images (e.g., in the database 40, from the Internet, and/or in the CAPTCHA image database 50, and/or images (or image material) generated by the application 30. The source of the replacement pixels depends on the selected change category determined in operation 215, and the selected modification. Some of the types of modifications by the application 30, for a given selected image part, may include replace, remove, change color, change color gradient, change size, duplicate, change orientation with respect to image axes, change texture, add (insert object), and/or some combination of these. In accordance with exemplary embodiments, the application 30 may rotate one object (selected image part) in an image to be upside down, but leave everything else right side up, and/or may adjust the scale of an object (selected image part) in an image to make one object far too large or too small for the image. Also, the application 30 may change the color and/or texture or any other imaginable modification that would make the object stand out contextually.

Figure 4:
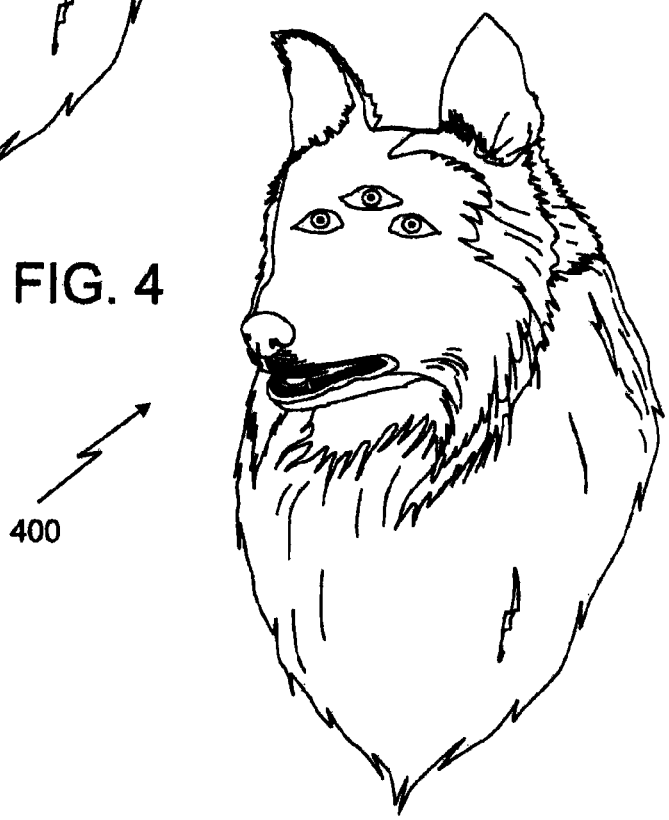

Further, with regard to the modification of adding objects in the CAPTCHA image (in addition to and/or without replacing other objects), FIG. 4 illustrates an example. In FIG. 4, the application 30 is operative to select an image change target (e.g., randomly select a point), select the modification as add an object, and then add the extra eye (or any source object) to the CAPTCHA image. In FIG. 4, the application 30 may select a random target location to insert an object (between the eyes). Also, the location may not be random, the application 30 may analyze the image to recognize the two eyes and add a duplicate eye in the vicinity of two eyes (in this case between the eyes). In FIG. 4, the application 30 selected the current image as the source for the object (eye) and the application 30 could have selected a different image to obtain the object. Moreover, in accordance with exemplary embodiments, the application 30 is operative to add out of context objects (like the third eye example), which may not replace an image part.

For each changed part in an image, the modifications from operation 220 are applied, creating single and/or multi-change CAPTCHAs, with their clickable regions at operation 225. By the application 30, multiple CAPTCHAs can be generated from a single image by applying one change, two changes, etc., and saving each step (i.e., each progressive change made to the image) as separate CAPTCHAs.

The application 30 is operative to save the CAPTCHA image with ancillary information (metadata) in the CAPTCHA image database 50 at operation 230. To be utilized later by the application 30, the ancillary information may include statistics (such as selection decisions for target (s), modification(s), and source(s), usage history, etc.) about the CAPTCHA images as accumulated data of the prior history of CAPTCHAs.

The operations in FIG. 2 in which selection decisions are automatically made (e.g., operations 210, 215, and 220) for which image element to change, which modification, and which pixel source are based in part on prior history of the decisions. That is, the relative success of a CAPTCHA is accumulated (e.g., by the application 30) over time based on its use. This accumulated data is summarized by the application 30 in the CAPTCHA image database 50. From the accumulated data, the application 30 is operative to automatically tune and improve the selection decisions (e.g., operations 210, 215, and 220) by using the growing accumulation of results data to guide image element, modification, and pixel source decisions.

Figure 3:
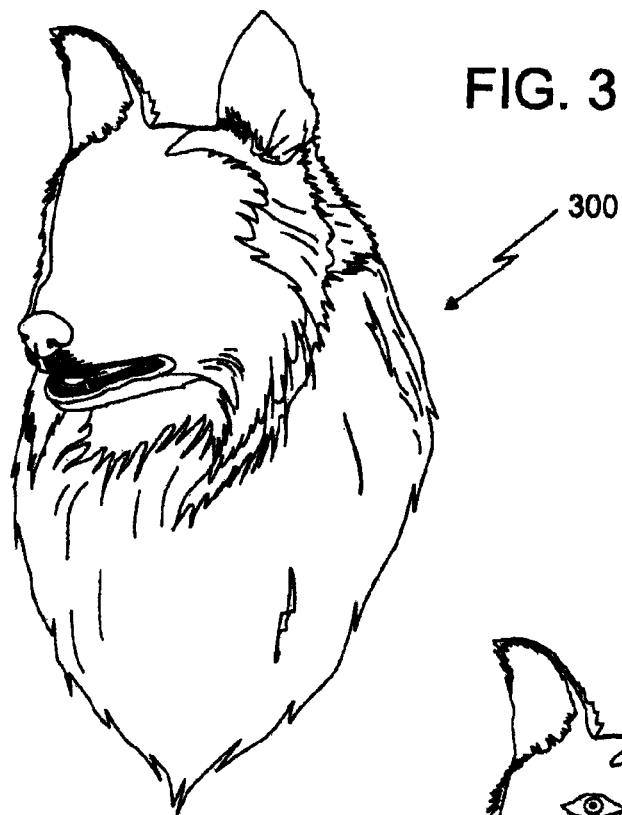
FIGS. 3-9 illustrate examples of CAPTCHA images in accordance with exemplary embodiments.

Additionally and/or alternatively, to create a "What's missing" CAPTCHA, the application 30 is operative to take one or more of the selected target objects (image parts) and replace the selected object(s) with image material respectively cloned from the source areas around the selected object(s). For example, as depicted in FIG. 3, the dog's eyes have been selected as the target and image material around the areas of the eyes has been cloned in CAPTCHA 300.

As discussed herein, the application 30 is operative to analyze the images and divide the input images into objects. For example, in dividing the image into the objects, the application 30 is operative to select blocks of a common color and/or select consistent patterns as objects; it is understood by one skilled in the art that other techniques may be utilized to divide the image into objects and examples provided herein are for explanation purposes not limitation. Also, these objects then can be used as input to insert contextual errors in CAPTCHA images. The application 30 is operative to convert the input image into a variety of click points to select as objects. The application 30 is operative to allow a user to select from a multitude of objects on the image by, e.g., clicking on the desired object.

For the auto-generated images of CAPTCHAs stored in the CAPTCHA database 50, the application 30 is operative not to swap in images that are too similar and difficult to detect. For example, if one were to swap an apple for an orange in a fruit basket or swap one eye for another eye on someone's face, the user of communication device 130 may not be able to properly detect "what is wrong" in the CAPTCHA. To prevent CAPTCHA images from having abnormalities that may be unnoticeable by a human, the application 30 is configured to perform recognition procedures for the objects. The application 30 is operative to compare the object being swapped in with the object that was already present in the image. If the application 30 determines that the average color and dimension is too similar between the two objects (the object being swapped in and the object already present in the image), the application 30 is operative to try swapping in a different object. Also, the application 30 may determine whether the degree of similarity between the two objects is below a similarity threshold, and if below the similarity threshold, the application 30 is operative to determine that the object should not be utilized. For example, the application 30 is operative to continue swapping in objects if needed, until the object being swapped in is distinct enough to, e.g., cross a threshold for average color and/or dimension.

Further, the application 30 is operative to limit the minimum size of the object being swapped in and the present object to make sure that any objects utilized in CAPTCHAs are large enough to be noticeable by a human. For example, the application 30 is operative to ensure that the objects (having abnormalities based on the context of the image) being tested in the CAPTCHA meet a minimum size requirement since the abnormalities for objects are based on the context of the CAPTCHA image.

Additionally, the application 30 is operative to typically ask the user to pass more than one of the CAPTCHA images with at least the first CAPTCHA image being a validated CAPTCHA, and the second CAPTCHA image being either a validated or test CAPTCHA. The application 30 can provide some "test" CAPTCHAs (which are newly generated CAPTCHAs) that will not necessarily identify a user as non-human if the user answers the test CAPTCHA incorrectly. After the user passes the first CAPTCHA, the application 30 is operative to determine that the user is a human, but further CAPTCHAs can be utilized to reinforce that fact. By providing additional CAPTCHAs, the application 30 can test out the new test CAPTCHAs at this point, and the application 30 will not fail the person if he or she cannot pass the "test" CAPTCHA. For example, success and failure statistics could be stored with the images in the CAPTCHA image database 50. If a statistically significant number of users successfully pass a test CAPTCHA, then the application 30 is operative to trust the test CAPTCHA and convert the test CAPTCHA to a validated CAPTCHA. On the other hand, if enough people fail to pass a particular test CAPTCHA, then the application 30 is operative to discard the test CAPTCHA as a bad image.

Suppose a CAPTCHA solving SPAM program attempted to solve the auto-generated images of CAPTCHAs by random clicking. Assume that the CAPTCHA image of exemplary embodiments is a typical 800 by 600 (800×600) pixel image. Also, assume that the CAPTCHA image is configured to allow clicks within a 20 by 20 section around the center of the error (the abnormal object) as an acceptable click. Then there are 1200 clickable sections in each CAPTCHA image. If each CAPTCHA image has anywhere from 1 to 3 errors, then there are 1200+(1200×1199)+(1200×1199*1198)=1,725,122,400 possible combinations of clicks in a single CAPTCHA image. Assuming the errors are normally distributed, if a Web site (e.g., hosted on the server 110) using the CAPTCHA service (utilizing, e.g., CAPTCHA images in the CAPTCHA library 50) only provides a new CAPTCHA attempt to a failing requestor once per second, then it is expected that random clicking would take over 27 years before yielding an acceptable answer. Having the application 30 require the user to correctly answer multiple consecutive CAPTCHAs further decreases the likelihood of random clicking succeeding. The consecutive CAPTCHAs would be valid CAPTCHAs for distinguishing between a human and computer and not "test" CAPTCHAs.

An additional test created by the application 30 could require the user to type in a description of what was wrong and/or missing from the CAPTCHA image, e.g., the CAPTCHAs depicted in FIGS. 3-9. This is a more difficult test than merely clicking a section (object) because no amount of brute force clicking will result in a correct result without understanding the context of the CAPTCHA image. The application 30 is operative to make sure that CAPTCHA images have correct tags to match the answers input by users. In one implementation of exemplary embodiments to obtain tags for CAPTCHA images, the application 30 is operative to require users to enter text describing the abnormality in the CAPTCHA image. For some CAPTCHAs which have not yet been tagged, the application 30 is operative to accept any typed answer and store the user entry in the CAPTCHA image database 50. The application 30 may utilize a word root analysis algorithm to allow for grouping of tags with similar underlying meanings (for example WordNet—http://wordnet.princeton.edu/). This would reduce the database size of the CAPTCHA image database 50 by only storing a root word meaning for each group of words and counts for the number of time each word sense occurs by the application 30. When a statistically significant number of responses by users match, the application 30 is operative to accept those matching responses as a valid tag for the CAPTCHA image, and future responses that have this tag will be accepted. Answers without this tag will indicate the user as a potential spammer, and the application 30 can provide other CAPTCHA images to verify that the user is a spammer.

Image matching by a spam program is another issue addressed by exemplary embodiments. Since the CAPTCHAs are automatically generated, the application 30 is operative to create enough CAPTCHAs so that it is not realistic for a program to store duplicate images and track clicks or to compare them to freely available images. Additionally, the application 30 is operative to provide a layer of systematic noise to make matching difficult. For example, if the application 30 randomly adds static, adds blur, and/or tweaks the overall colors for the whole CAPTCHA image, then these changes will not affect the individual click points (objects), but will make a CAPTCHA reusable without being an identical image. This will make matching by a CAPTCHA solving program more difficult.

FIGS. 3-9 illustrate example CAPTCHAs by the application 30 in accordance with exemplary embodiments. FIGS. 3-9 illustrate examples of CAPTCHAs by the application 30 which depicts various abnormalities that are out of context in accordance with exemplary embodiments. The various abnormalities in the CAPTCHAs would be recognized by a human based on the context of the CAPTCHA, but not identifiable by a spam computer program. The example CAPTCHAs in FIGS. 3-9 are only for explanation purposes and are not meant to be limiting.

FIG. 3 is an example of a CAPTCHA 300 by the application 30 that illustrates a dog having no eyes in accordance with exemplary embodiments. As discussed herein, the application 30 is operative to obtain a stock image of the CAPTCHA 300 and select for example the eyes of the dog as two target objects. The application 30 is operative to remove the eyes from the dog image. The application 30 is operative to clone the source image material of the areas around the eyes and replace the areas in which the eyes were previously removed with the cloned image materials (e.g., color pattern). Accordingly, the application 30 causes the area of the missing eyes to look and appear (e.g., have the same pattern, colors, textures, etc.) like the image material of other areas surrounding the eyes.

FIG. 4 is an example of a CAPTCHA 400 by the application 30 that illustrates a dog having an additional eye in accordance with exemplary embodiments. In CAPTCHA 400, the dog has three eyes. Between the two normal eyes, a third eye has been added in the CAPTCHA 400 by the application 30. In this case, the application 30 is operative to select the eye as a source object from a stock dog image. The application 30 copied the eye and placed the copied eye at the target location between the two normal eyes. It is understood that the application 30 could have copied an eye from a completely different picture, such as another animal (e.g., a horse, cow, dog, cat, etc.), a person (with a different eye color), and/or any object (such as a button, small swimming pool, a ball, etc.) and placed that particular source object between the two normal eyes. Further, the application 30 is configured to replace one or both of the existing normal eyes of the dog with a different object mentioned above and/or some other object in accordance with exemplary embodiments.

Figure 5:
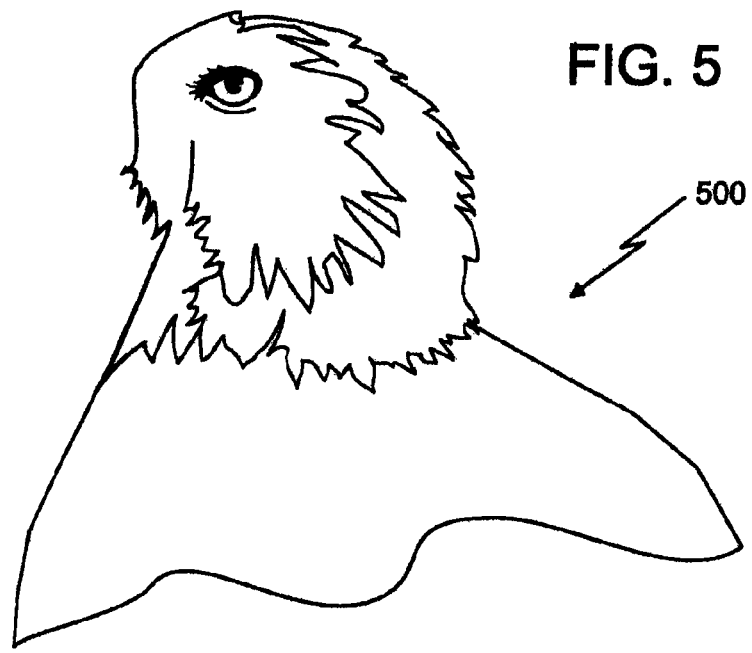

FIG. 5 is an example of a CAPTCHA 500 by the application 30 that illustrates an example of an eagle with no beak in accordance with exemplary embodiments. In CAPTCHA 500, the application 30 removed the target beak and/or copied over the beak. For example, the application 30 is operative to clone the image material of one or more areas around the beak and place the clone areas in the location of the beak. The application 30 may first remove the beak before placing the cloned areas in the location of the beak, and/or the application 30 may place the cloned areas on top of the beak such that the beak can no longer be seen. It is understood that the method of removing the beak by the application 30 in FIG. 5 is not meant to be limiting.

Figure 6:
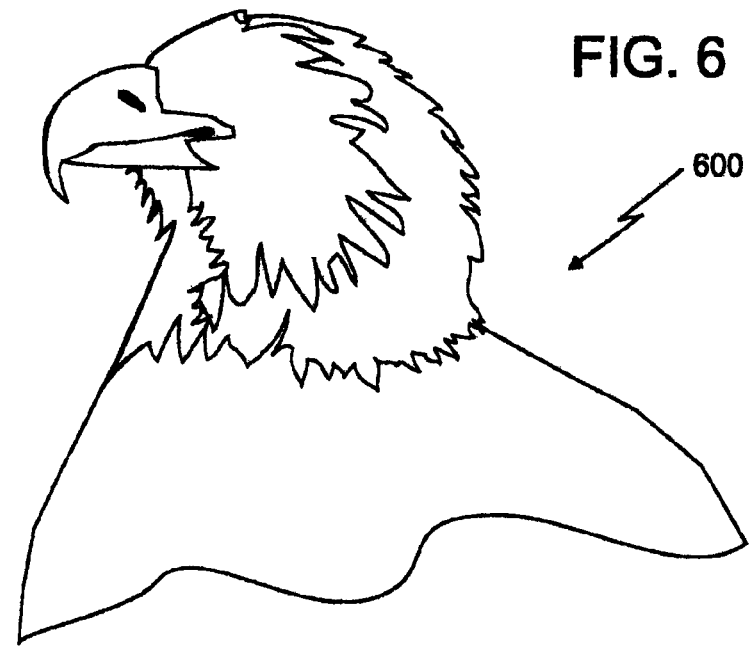

FIG. 6 is an example of a CAPTCHA 600 by the application 30 that illustrates an example of an eagle with no eyes in accordance with exemplary embodiments. The application 30 is operative to remove the eyes of the eagle image and replace the eyes with cloned image material from the area surrounding the eyes. For example, the application 30 is operative to clone areas to the left, right, top, and/or bottom of the removed object, which is the eagle's eye in this example.

Figure 7:
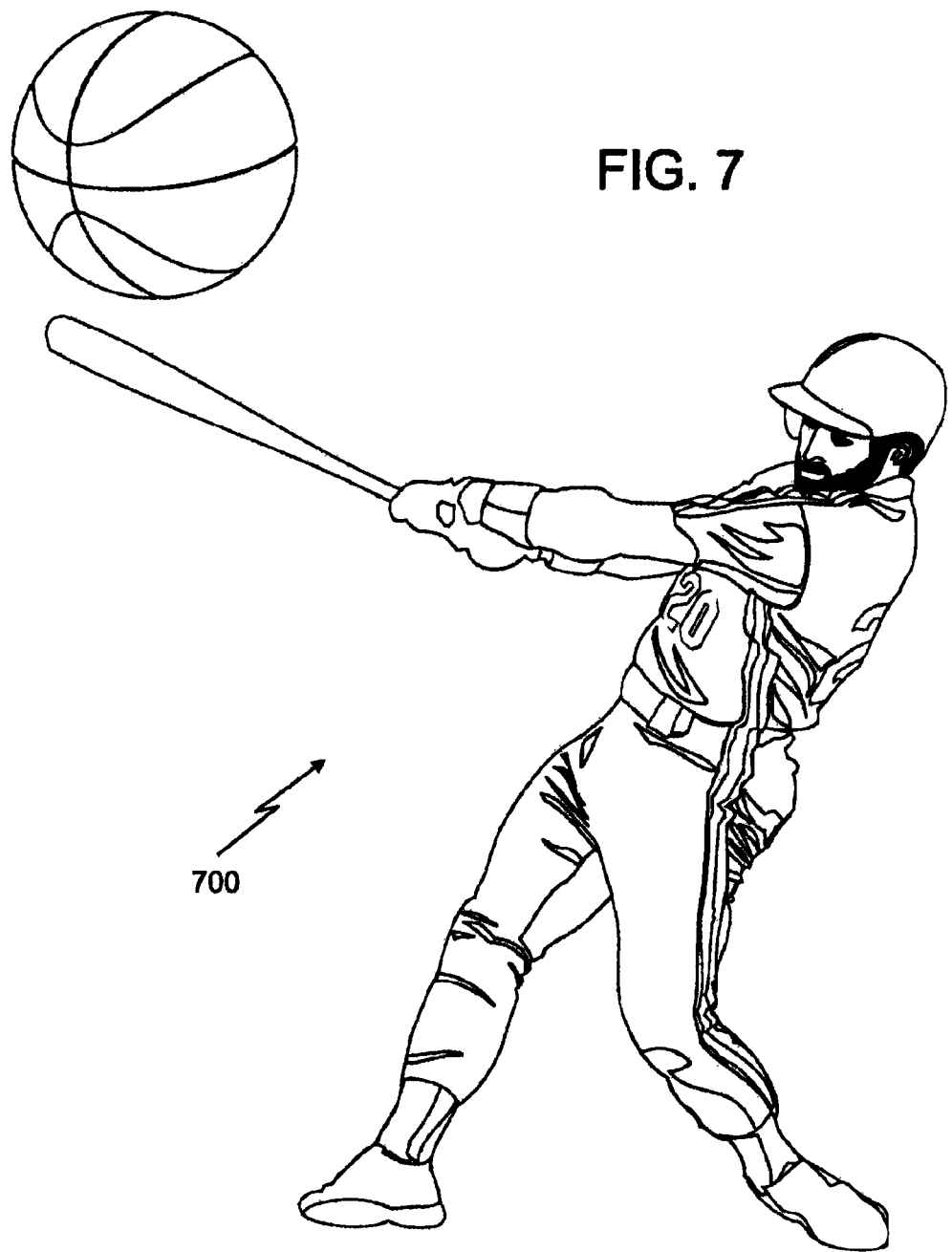

FIG. 7 is an example of a CAPTCHA 700 by the application 30 that illustrates an example of a baseball player hitting a basketball ball with a bat in accordance with exemplary embodiments. In CAPTCHA 700, the application 30 has removed the normal baseball and replace the baseball with a basketball. The application 30 is operative to retrieve a stock image of the baseball player hitting a baseball with a bat. The application 30 is operative to identify and select the baseball as an object in the stock image, and the application 30 is operative to select a basketball from a different image (or the same image). The application 30 is operative to replace the baseball by overlaying the baseball with the basketball in the CAPTCHA 700 so that the baseball player is hitting the basketball instead of the baseball. In FIG. 7, the application 30 is operative to locate a similarly shaped object (the basketball) as the baseball and swap the baseball for the similarly shaped object.

FIG. 8 is an example of a CAPTCHA 800 by the application 30 that illustrates an example of a baseball player swinging at a baseball with no bat in his hands accordance with exemplary embodiments. In the CAPTCHA 800, the application 30 is operative to select the baseball bat as an object. The application 30 is operative to clone the image material of areas around the baseball bat and replace the baseball bat with the cloned image material of the areas.

Figure 9:
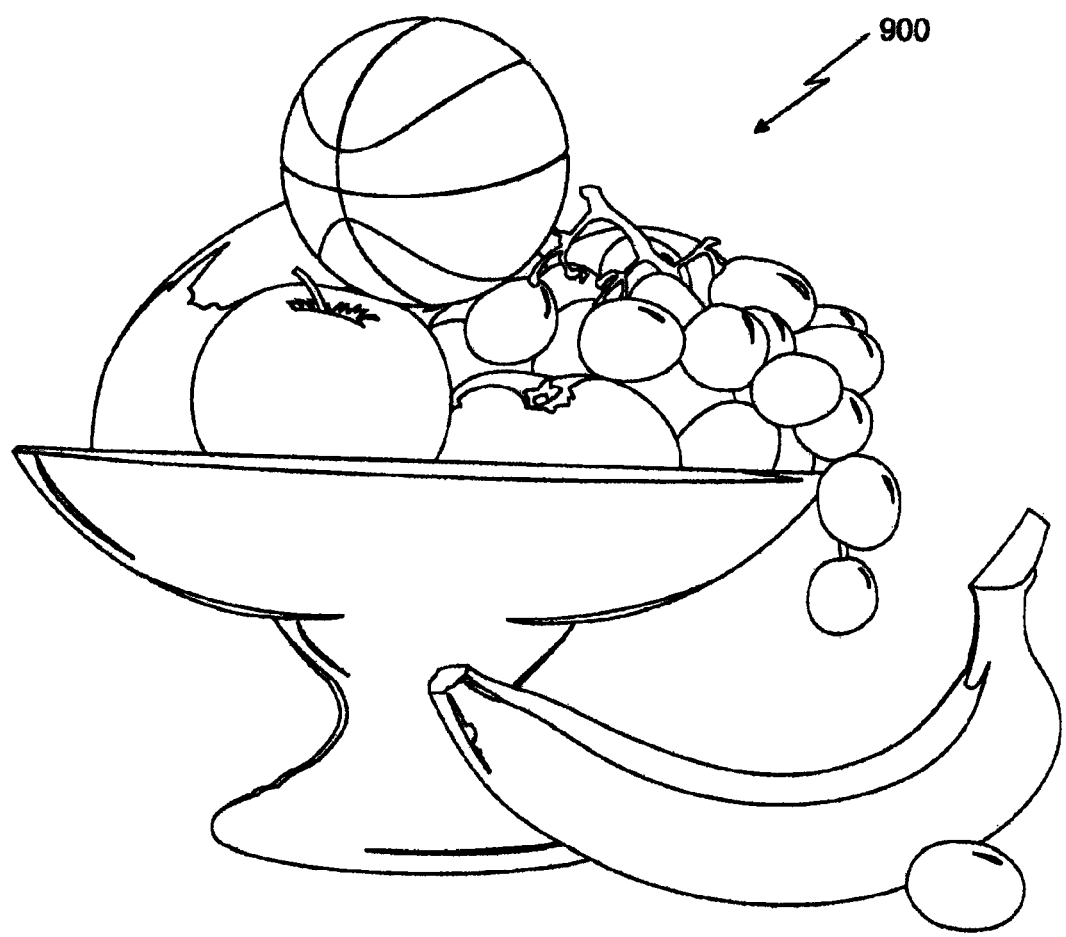

FIG. 9 is an example of a CAPTCHA 900 by the application 30 that illustrates an example of a basket of fruit including a basketball in accordance with exemplary embodiments. The application 30 is operative to select one or more grapes as objects. The application 30 is operative to select a basketball from a different image, and the application 30 is operative to replace and/or cover up the selected grapes as objects. Additionally and/or alternatively, the application 30 is operative to recognize that various objects in the fruit basket are round, such as the grapes and apples. The application 30 is operative to select a round object, such as the basketball, from a different image and insert the basketball in the basket with the other objects. Additionally and/or alternatively, the application 30 is operative to select a circle as the target geometric shape and fill it with the source pixels from the basketball or to choose a target point in the image and insert the source basketball object. There are many different possible ways this particular CAPTCHA image could have been generated by the application 30 according to exemplary embodiments.

In all the CAPTCHAs illustrated in FIGS. 3-9 and discussed herein, selectable points of the CAPTCHAs are configured to be selected by the user of the communication device 130. That is, many different objects on the CAPTCHAs can be selected by, e.g., a mouse click or the like, and correct answers such as the abnormalities can be selected along with incorrect answers. The application 30 is operative to determine whether a correct answer or incorrect answer is selected by the user of the communication device 130. Furthermore, each CAPTCHA may include the application 30 and/or other software needed to operate the CAPTCHA as a test for distinguishing between a human and non-human (e.g., computer) and for determining when correct answers and/or incorrect answers have been selected.

Based on the present disclosure, it is understood that only examples of CAPTCHAs are illustrated in accordance exemplary embodiments, and it is understood that countless CAPTCHAs can be generated in accordance with exemplary embodiments. For example, a CAPTCHA of the application 30 may illustrate a horse with one or more legs replaced with golf clubs (human legs, tree trunks, doors, etc.) such that the CAPTCHA depicts a horse standing on golf clubs.

Figure 10:
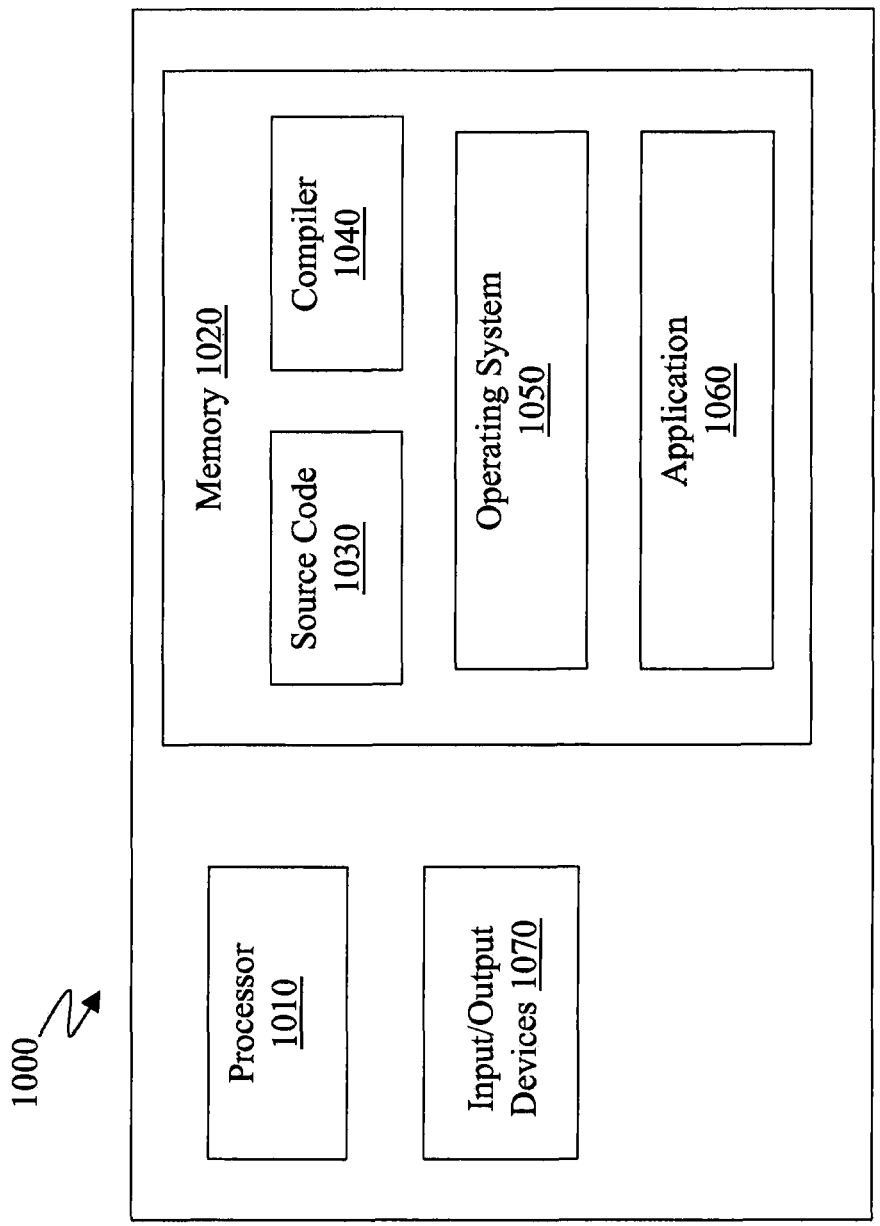
FIG. 10 illustrates an example of a computer having capabilities, which may be included in exemplary embodiments.

FIG. 10 illustrates an example of a computer 1000 having capabilities, which may be included in exemplary embodiments. Various methods, procedures, modules, flow diagrams, and techniques discussed herein may also incorporate and/or utilize the capabilities of the computer 1000. Moreover, capabilities of the computer 1000 may be utilized to implement features exemplary embodiments discussed herein. One or more of the capabilities of the computer 1000 may be implemented in any element discussed herein, e.g., such as computing device 10, server 110, communication device 130, and/or the CAPTCHAs.

Generally, in terms of hardware architecture, the computer 1000 may include one or more processors 1010, computer readable storage memory 1020, and one or more input and/or output (I/O) devices 1070 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 1010 is a hardware device for executing software that can be stored in the memory 1020. The processor 1010 can be virtually any custom made or commercially available processor, a central processing unit (CPU), a data signal processor (DSP), or an auxiliary processor among several processors associated with the computer 1000, and the processor 1010 may be a semiconductor based microprocessor (in the form of a microchip) or a macroprocessor.

The computer readable memory 1020 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 1020 may incorporate electronic, magnetic, optical, and/or other types of storage media. Note that the memory 1020 can have a distributed architecture, where various components are situated remote from one another, but can be accessed by the processor 1010.

The software in the computer readable memory 1020 may include one or more separate programs, each of which comprises an ordered listing of executable instructions for implementing logical functions. The software in the memory 1020 includes a suitable operating system (O/S) 1050, compiler 1040, source code 1030, and one or more applications 160 of the exemplary embodiments. As illustrated, the application 1060 comprises numerous functional components for implementing the features, processes, methods, functions, CAPTCHAs, and operations of the exemplary embodiments. The application 1060 of the computer 1000 may represent numerous applications, agents, software components, modules, interfaces, controllers, etc., as discussed herein but the application 1060 is not meant to be a limitation.

The operating system 1050 may control the execution of other computer programs, and provides scheduling, input-output control, file and data management, memory management, and communication control and related services.

The application(s) 1060 may employ a service-oriented architecture, which may be a collection of services that communicate with each. Also, the service-oriented architecture allows two or more services to coordinate and/or perform activities (e.g., on behalf of one another). Each interaction between services can be self-contained and loosely coupled, so that each interaction is independent of any other interaction.

Further, the application 1060 may be a source program, executable program (object code), script, or any other entity comprising a set of instructions to be performed. When a source program, then the program is usually translated via a compiler (such as the compiler 1040), assembler, interpreter, or the like, which may or may not be included within the memory 1020, so as to operate properly in connection with the O/S 1050. Furthermore, the application 1060 can be written as (a) an object oriented programming language, which has classes of data and methods, or (b) a procedure programming language, which has routines, subroutines, and/or functions.

The I/O devices 1070 may include input devices (or peripherals) such as, for example but not limited to, a mouse, keyboard, scanner, microphone, camera, etc. Furthermore, the I/O devices 1070 may also include output devices (or peripherals), for example but not limited to, a printer, display, etc. Finally, the I/O devices 1070 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 1070 also include components for communicating over various networks, such as the Internet or an intranet. The I/O devices 1070 may be connected to and/or communicate with the processor 1010 utilizing Bluetooth connections and cables (via, e.g., Universal Serial Bus (USB) ports, serial ports, parallel ports, FireWire, HDMI (High-Definition Multimedia Interface), etc.).

When the computer 1000 is in operation, the processor 1010 is configured to execute software stored within the memory 1020, to communicate data to and from the memory 1020, and to generally control operations of the computer 1000 pursuant to the software. The application 1060 and the O/S 1050 are read, in whole or in part, by the processor 1010, perhaps buffered within the processor 1010, and then executed.

When the application 1060 is implemented in software it should be noted that the application 1060 can be stored on virtually any computer readable storage medium for use by or in connection with any computer related system or method. In the context of this document, a computer readable storage medium may be an electronic, magnetic, optical, or other physical device or means that can contain or store a computer program for use by or in connection with a computer related system or method.

The application 1060 can be embodied in any computer-readable medium 1020 for use by or in connection with an instruction execution system, apparatus, server, or device, such as a computer-based system, processor-containing system, or other system that can fetch the instructions from the instruction execution system, apparatus, or device and execute the instructions. In the context of this document, a "computer-readable storage medium" can be any means that can store, read, write, communicate, or transport the program for use by or in connection with the instruction execution system, apparatus, or device. The computer readable medium can be, for example but not limited to, an electronic, magnetic, optical, or semiconductor system, apparatus, or device.

More specific examples (a nonexhaustive list) of the computer-readable medium 1020 would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 1060 is implemented in hardware, the application 1060 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It is understood that the computer 1000 includes non-limiting examples of software and hardware components that may be included in various devices, servers, and systems discussed herein, and it is understood that additional software and hardware components may be included in the various devices and systems discussed in exemplary embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the exemplary embodiments of the invention have been described, it will be understood that those skilled in the art, both now and in the future, may make various improvements and enhancements which fall within the scope of the claims which follow. These claims should be construed to maintain the proper protection for the invention first described.

What is claimed is:

1. A method for automatically generating contextual animal image tests implemented on a computer, comprising:
   receiving, by a computer, an animal image;
   dividing, by the computer, the animal image into objects such that the objects can be selected;
   selecting, by the computer, for replacement an original object from the objects; replacing, by the computer, the original object with a similarly shaped replacement object, the original object being swapped for the replacement object in the animal image, wherein the replacement object is an abnormality in the image;
   identifying, by the computer, the objects that represent animal sensory features of an animal that is non-human in the animal image;
   in a first case, removing by the computer the animal sensory features of the animal in the animal image to cause the animal in the animal image to visually display without the animal sensory features based on a visual context of the animal in the animal image calling for the animal sensory features to be displayed;
   in a second case, duplicating by the computer the animal sensory features of the animal in the animal image to cause the animal in the animal image to visually display with an additional animal sensory feature based on the visual context of the animal in the animal image not calling for the additional animal sensory feature,
   and, wherein the replacing, removing and duplicating are based on prior history of relative success.

2. The method of claim 1, further comprising: recognizing a selection of the replacement object as a correct answer;
   wherein the animal sensory features of the animal in the animal image comprise at least one of an animal eye of a non-human and an animal mouth of a non-human;
   wherein removing the animal sensory features of the animal in the animal image to cause the animal in the animal image to visually display without the animal sensory features results in the animal image of a bird with no beak; and
   wherein duplicating the animal sensory features of the animal in the animal image to cause the animal in the animal image to visually display with the additional animal sensory feature results in the animal image of a dog with three eyes.

3. The method of claim 1, wherein the replacement object is the abnormality because the replacement object is configured not to adhere to a context of the animal image.

4. The method of claim 1, wherein replacing the original object with the replacement object causes the animal image to visually appear abnormal to a human within a context of the animal image.

5. The method of claim 1, wherein the animal image is configured to allow a user to select the replacement object in the animal image by clicking on the replacement object.

6. The method of claim 1, wherein the selecting and replacing steps comprise:
   selecting a remove object from the objects, the remove object being in an area on the animal image;
   cloning an area around the remove object to create a clone replacement from the area; and
   replacing the remove object with the clone replacement in the animal image.

7. The method of claim 6, wherein the clone replacement is created to visually blend in with the area.

8. The method of claim 6, wherein the clone replacement is selectable as a correct answer.

9. The method of claim 6, wherein the clone replacement is configured as an abnormality in the animal image.

10. The method of claim 6, further comprising: removing the remove object from the area such that the absence of the remove object visually appears as an abnormality within a context of the animal image.

11. The method of claim 6, wherein replacing the remove object with the clone replacement in the animal image causes the animal image to visually appear abnormal to a human within a context of the animal image.

12. The method of claim 6, wherein the animal image is configured to allow a user to select the clone replacement in the animal image by clicking on the clone replacement.

13. A computing device configured to automatically generate contextual animal image tests, comprising:
   memory for storing a program;
   and a processor, functionally coupled to the memory, the processor being responsive to computer-executable instructions contained in the program and operative for:
   receiving an animal image;
   dividing the animal image into objects such that the objects can be selected; and selecting for replacement an original object from the objects;
   replacing the original object with a similarly shaped replacement object, the original object being swapped for the replacement object in the animal image, wherein the replacement object is an abnormality in the animal image;
   identifying, by the computer, the objects that represent animal sensory features of an animal that is non-human in the animal image;
   in a first case, removing by the processor the animal sensory features of the animal in the animal image to cause the animal in the animal image to visually display without the animal sensory features based on a visual context of the animal in the animal image calling for animal sensory features to be displayed;

in a second case, duplicating by the processor the animal sensory features of the animal in the animal image to cause the animal in the animal image to visually display with an additional animal sensory feature based on the visual context of the animal in the animal image not calling for the additional animal sensory feature and, wherein the replacing, removing and duplicating are based on prior history of relative success.

14. The device of claim 13, wherein the processor is further operative for: recognizing a selection of the replacement object as a correct answer.

15. The device of claim 13, wherein the replacement object is the abnormality because the replacement object is configured not to adhere to a context of the animal image.

16. The device of claim 13, wherein replacing the original object with the replacement object causes the animal image to visually appear abnormal to a human within a context of the animal image.

17. The device of claim 13, wherein the animal image is configured to allow a user to select the replacement object in the animal image by clicking on the replacement object.

18. The device of claim 13, wherein the selecting and replacing comprise:
   selecting a remove object from the objects, the remove object being in an area on the animal image;
   cloning the area around the remove object to create a clone replacement of the area; and
   replacing the remove object with the clone replacement in the animal image.

19. The device of claim 18, wherein the clone replacement is created to visually blend in with the area.

20. The device of claim 18, wherein the clone replacement is selectable as a correct answer.

21. The device of claim 18, wherein the clone replacement is configured as an abnormality in the animal image; or
   wherein replacing the remove object with the clone replacement in the animal image causes the image to visually appear abnormal to a human within a context of the animal image.

22. The device of claim 18, wherein the processor is further operative for: removing the remove object from the area such that the absence of the remove object visually appears as an abnormality within a context of the animal image.

23. A method for automatically generating contextual animal image tests implemented on a computer, comprising:
   receiving, by the computer, an animal image;
   selecting, by the computer, one or more image parts of the animal image for change based on image analysis;
   determining, by the computer, modifications for the selected one or more animal image parts and a modification source for each selected animal image part;
   applying, by the computer, the modifications to the selected one or more animal image parts to create a modified animal image;
   identifying, by the computer, one or more animal image parts that represent animal sensory features of an animal that is non-human in the animal image;
   in a first case, removing by the computer the animal sensory features of the animal in the animal image to cause the animal in the animal image to visually display without the animal sensory features based on a visual context of the image calling for the animal sensory features to be displayed;
   in a second case, duplicating by the computer the animal sensory features of the animal in the animal image to cause the animal in the image to visually display with an additional animal sensory feature based on the visual context of the animal image not calling for the additional animal sensory feature;
   and, wherein the replacing, removing and duplicating are based on prior history of relative success.

24. The method of claim 23, wherein the modifications for the selected animal image part comprise:
   replacing the selected animal image part;
   changing a color of the selected animal image part;
   changing a color gradient of the selected animal image part;
   changing a size of the selected animal image part;
   duplicating the selected animal image part;
   changing an orientation with respect to image axes for the selected animal image part;
   changing a texture of the selected animal image part; and
   adding an object at a location of the selected animal image part.

25. The method of claim 24, wherein adding the object at the location of the selected animal image part comprises inserting the object in the animal image; and
   wherein the object is duplicated from the animal image as the modification source or the object is copied from a different animal image as the modification source.

* * * * *